United States Patent
Schreiber et al.

(10) Patent No.: US 9,169,687 B2
(45) Date of Patent: Oct. 27, 2015

(54) INSULATING GLAZING WITH THERMAL PROTECTION INSULATING PANEL

(75) Inventors: Walter Schreiber, Aachen (DE); Katrin Frank, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/131,645

(22) PCT Filed: Jul. 19, 2012

(86) PCT No.: PCT/EP2012/064204
§ 371 (c)(1),
(2), (4) Date: Mar. 11, 2014

(87) PCT Pub. No.: WO2013/029871
PCT Pub. Date: Mar. 7, 2013

(65) Prior Publication Data
US 2015/0075902 A1    Mar. 19, 2015

(30) Foreign Application Priority Data
Aug. 26, 2011 (EP) .................................... 11178971

(51) Int. Cl.
| E04B 1/84 | (2006.01) |
| E06B 3/67 | (2006.01) |
| E04B 1/80 | (2006.01) |
| E04B 1/90 | (2006.01) |

(Continued)

(52) U.S. Cl.
CPC ............... *E06B 3/6707* (2013.01); *E04B 1/803* (2013.01); *E04B 1/90* (2013.01); *E06B 3/6612* (2013.01); *E06B 3/6715* (2013.01); *E06B 3/67304* (2013.01); *Y02B 80/12* (2013.01); *Y02B 80/14* (2013.01); *Y02B 80/26* (2013.01)

(58) Field of Classification Search
CPC ..................................... E04B 1/84; E04B 1/86
USPC .......................................... 181/294, 290, 284
See application file for complete search history.

(56) References Cited

U.S. PATENT DOCUMENTS

| 4,831,799 A | 5/1989 | Glover et al. |
| 5,962,090 A | 10/1999 | Trautz |
| 6,444,281 B1 * | 9/2002 | Wang et al. ..................... 428/34 |

(Continued)

FOREIGN PATENT DOCUMENTS

| CN | 1377329 | 10/2002 |
| CN | 1678810 | 10/2005 |

(Continued)

OTHER PUBLICATIONS

Written Opinion mailed on Sep. 10, 2012 for PCT/EP2012/064204 filed on Jul. 7, 2012 in the name of Saint-Gobain Glass France; German to English Translation.

(Continued)

*Primary Examiner* — Forrest M Phillips
(74) *Attorney, Agent, or Firm* — Steinfl & Bruno LLP

(57) ABSTRACT

A sound-damped insulating glazing is described. The glazing has a first pane and a second pane, a peripheral spacer between the first pane and the second pane, an externally encircling seal in a gap between the first pane, the peripheral spacer and the second pane, a vacuum insulating panel between the first pane, the second pane and the peripheral spacer, and at least one acoustic insulating plate is arranged on at least one surface of the vacuum insulating panel.

18 Claims, 3 Drawing Sheets

Figure 1:
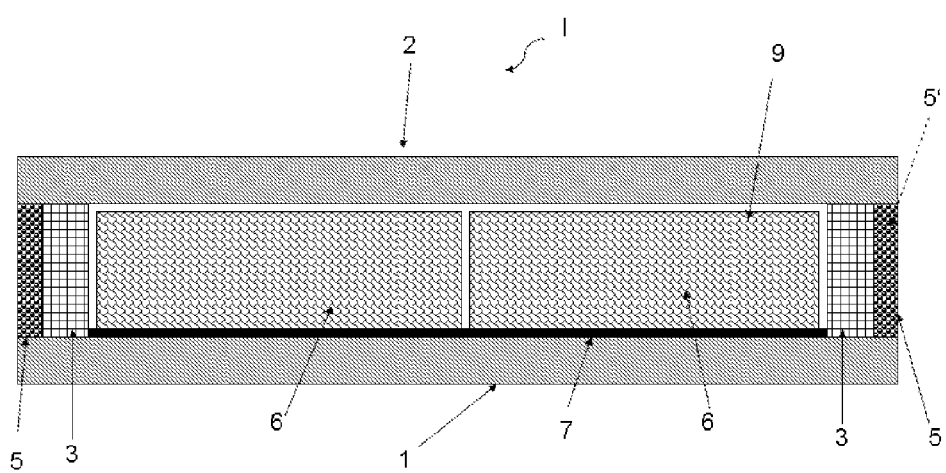

(51) Int. Cl.
  *E06B 3/66* (2006.01)
  *E06B 3/673* (2006.01)

(56) References Cited

U.S. PATENT DOCUMENTS

| | | | | |
|---|---|---|---|---|
| 6,503,583 | B2 * | 1/2003 | Nalepka et al. | 428/34 |
| 6,541,083 | B1 * | 4/2003 | Landa et al. | 428/34 |
| 7,121,380 | B2 * | 10/2006 | Garnier et al. | 181/286 |
| 7,721,844 | B1 * | 5/2010 | Lewis et al. | 181/207 |
| 7,909,133 | B2 * | 3/2011 | Payot et al. | 181/208 |
| 2005/0064101 | A1 * | 3/2005 | Messere et al. | 427/372.2 |
| 2006/0118356 | A1 * | 6/2006 | Beeson et al. | 181/287 |
| 2007/0148379 | A1 * | 6/2007 | Theios et al. | 428/34 |
| 2008/0020154 | A1 * | 1/2008 | Landon et al. | 428/34 |
| 2008/0026166 | A1 * | 1/2008 | Pilloy | 428/34 |
| 2009/0008185 | A1 * | 1/2009 | Cheng et al. | 181/206 |
| 2009/0277594 | A1 * | 11/2009 | Stewart et al. | 160/311 |

FOREIGN PATENT DOCUMENTS

| | | |
|---|---|---|
| DE | 4029405 | 9/1991 |
| DE | 4319763 | 12/1994 |
| DE | 4339435 | 5/1995 |
| DE | 19923057 | 11/2000 |
| DE | 10034764 | 12/2001 |
| DE | 102010010493 (B3) | 7/2011 |
| DE | 102010010493 | 9/2011 |
| EP | 0261923 | 3/1988 |
| EP | 0430889 | 6/1991 |
| EP | 0852280 | 7/1998 |
| JP | 2010138027 (A) | 6/2010 |
| WO | 0116046 | 3/2001 |
| WO | 2004005783 | 1/2004 |

OTHER PUBLICATIONS

International Preliminary Report on Patentability mailed on Mar. 4, 2014 for PCT/EP2012/064204 filed on Jul. 7, 2012 in the name of Saint-Gobain Glass France; German to English Translation.

International Search Report mailed on Sep. 10, 2012 for PCT/EP2012/064204 filed on Jul. 19, 2012 in the name of Saint-Gobain Glass France—German to English translation.

First Office Action issued on Jan. 27, 2015 for CN 201280065773.7 filed on Dec. 20, 2012 in the name of Saint-Gobain Glass France (English + Chinese).

1-Notice of Preliminary Rejection issued for Korean Patent Application No. 10-2014-7004513 filed on Jul. 19, 2012 in the name of Saint Gobain (English Translation & Korean Original). Mail date: Jun. 15, 2015.

* cited by examiner

INSULATING GLAZING WITH THERMAL PROTECTION INSULATING PANEL

CROSS REFERENCE TO RELATED APPLICATIONS

The present application is the US national stage of International Patent Application PCT/EP2012/064204 filed on Jul. 19, 2012 which, in turn, claims priority to European Patent Application EP 11178971.5 filed on Aug. 26, 2011.

The invention relates to an insulating glazing with a thermal protection insulating panel, a method for its production, and its use.

The thermal conductivity of glass is lower by roughly a factor of 2 to 3 than that of concrete or similar building materials. Consequently, the greatest share of heat loss from buildings is through external glazing. This effect is particularly notable in high-rise buildings with partial or complete glass façades. Insulating glazings constitute an important approach for a solution. Primarily due to increasingly hope this one was rapidly rising prices of raw materials and ever more stringent environmental protection constraints, it is no longer possible to imagine the building construction sector without insulating glazings. Consequently, insulating glazings make up an increasingly greater share of outward-directed glazings. Insulating glazings include, as a rule, at least two panes of glass or polymeric materials or polymers. The panes are separated from each other by a gas or vacuum space defined by a spacer. The thermal insulating capacity of insulating glass is clearly higher than for single plane glass and can be further increased and improved in triple glazings or with special coatings. In addition to the important property of thermal insulation, optical and aesthetic characteristics play an increasingly important role in the field of structural glazing.

In particular in buildings with an extensive glass exterior façade, the insulating effect plays an important role not merely for reasons of cost. Since the thermal insulation of very thin glass is, as a rule, worse in comparison to masonry, improvements are necessary in this area. In order not to detract from the overall impression of the building, combinations of well-insulating masonry and glass elements are for the most part not readily possible. One possible approach to a solution is insulating glass panes with insulating elements situated in the interspace of the panes. The insulating elements include various thermally insulating materials and insulants. Frequently, the insulants are packed in gas- and moisture-tight films. The entire insulating element is then evacuated. These insulating elements have a clearly lower thermal transfer than pure insulating glazing. Especially in areas where the transparency of the insulating glazing is not necessary, the thermal insulation of a building can be significantly increased without interfering with the overall impression of the façade.

The integration of the insulating elements in the insulating glazing is, however, not easily accomplished. Frequently, the insulating glazings are not completely filled with the insulating elements and empty spaces form. These empty spaces are created due to dimensional tolerances or due to the use of multiple insulating elements in one insulating glazing. In particular, relatively large external façade elements require multiple insulating elements and thus almost inevitably create empty spaces.

In addition to thermal insulation, acoustic insulation plays an increasingly important role. Primarily, the street noise generated by an increasing volume of traffic has a negative effect on the quality of life and living inside a building. As with thermal insulation, the acoustic insulating effect of glass panes is clearly lower compared to brick or concrete.

DE 40 29 405 A1 discloses the structure and composition of thermal insulating elements. For this, a powdered or fibrous substance is filled into a microporous covering and dried. Then, the microporous covering is introduced into a gas- and moisture-tight film and, if appropriate, evacuated.

DE 43 19 763 A1 discloses an evacuated light-impermeable multi-pane insulating glass panel. The pane interspace is filled with a microcrystalline or nanocrystalline powder and then evacuated.

DE 43 39 435 A1 discloses a light-impermeable multilayer pane panel for building façades, intermediate walls, and cold-storage rooms. At least one plate-like, evacuated body is arranged inside an insulating glazing.

DE 100 34 764 A1 discloses a panel with an inner and outer pane and a water-, vapor-, and gas-tight edge bond. The interspace contains a thermal insulating powder that is situated in an evacuated sack.

The object of the invention is to provide an insulating glazing which combines both a thermal insulating and a sound insulating effect and has properties comparable to structural elements made of stone, plaster, or concrete.

The object of the present invention is accomplished according to the invention by a sound-damped insulating glazing in accordance with claim 1. Preferred embodiments emerge from the subclaims.

A method according to the invention for producing a sound-damped insulating glazing as well as its use emerge from other coordinated claims.

The sound-damped insulating glazing according to the invention comprises at least a first pane and a second pane. A peripheral spacer is situated between the first pane and the second pane. The spacer preferably includes hollow spaces. The hollow spaces of the spacer preferably contain a desiccant, particularly preferably silica gel, $CaCl_2$, $Na_2SO_4$, $MgSO_4$, activated carbon, silicates, bentonites, zeolites, and/or mixtures thereof. The desiccants are preferably arranged such that a gas and moisture exchange with the atmosphere in the interior of the insulating glazing is possible, but the materials cannot fly around and are fixed. This can preferably be accomplished by enclosing the desiccants in a air and moisture permeable polymer film or a fine-meshed net. The pane preferably contains flat glass, float glass, quartz glass, borosilicate glass, soda lime glass, and/or mixtures thereof. Alternatively, the pane can also include polymers such as polycarbonate or polymethyl methacrylate (Plexiglas). A seal closes an external interspace, gap, or joint between the first pane, the spacer, and the second pane. The first pane and the second pane can have the same or different dimensions. In a preferred embodiment, one of the two panes can be designed as a laminated glass pane such that there is, overall, a triple glazing. Alternatively, both panes can even be designed as laminated glass panes and form a quadruple glazing. A vacuum insulating panel is arranged between the first pane and the second pane. The vacuum insulating panel includes a fibrous or powdered substrate that is packed in a gas- and moisture-tight film and evacuated. Examples of powdered substrates are found, for example, in DE 4029405 A1. Between the first pane and the vacuum insulating panel (on the surface of the vacuum insulating panel or a plurality of adjacent vacuum insulating panels), an acoustic insulating plate is arranged two-dimensionally or flat. The acoustic insulating plate preferably includes sound-insulating polymer plates, preferably polymer plates which, with a thickness of at least 50 mm, have a sound absorption coefficient of at least 0.5 (in accordance with ISO-10534-2, measured in the range from 600 Hz to 4000 Hz).

The insulating glazing according to the invention preferably includes two or more vacuum insulating panels. The number of vacuum insulating panels is determined primarily based on the size of the insulating glazing. An acoustic dividing plate is preferably arranged between the vacuum insulating panels. The acoustic dividing plate preferably includes the same material as the acoustic insulating plate. The acoustic dividing plate preferably fills the interspace between two vacuum insulating panels.

In addition, the acoustic insulating plate is preferably arranged between the second pane and the vacuum insulating panel, between the spacer and the vacuum insulating panel, and/or between the first pane and the vacuum insulating panel. The acoustic insulating panel can fill and cover all external surfaces of the vacuum insulating panel relative to the panes or the spacers. A maximum filling of the interspaces quite substantially increases the sound insulation and also the thermal insulation.

The acoustic insulating plate preferably has a thickness of 0.5 mm to 5 mm. The thickness of the acoustic insulating plate is preferably determined based on the size of the interspace between the vacuum insulating panels and the first pane or the second pane.

The acoustic insulating plate and/or the acoustic dividing plate preferably contain thermoplastic, elastic, or duroplastic polymer foams, preferably polystyrene, or polyurethanes, polyethylene, polyvinyl chloride, melamine resin, soft PUR (soft polyurethane foam), and/or hard PUR (hard polyurethane foam) or mixtures and/or copolymers thereof.

The vacuum insulating panel preferably contains a filler, particularly preferably powder, fibers, or feathers, particularly preferably $SiO_2$ or an aerogel powder. The filler, together with the evacuation of the vacuum insulating panel, improves the insulation effect.

The filler preferably has a mean diameter of 10 nm to 100 μm. A narrow size distribution and homogeneous geometric shape of the filler improves the insulation effect of the vacuum insulating panel.

The vacuum insulating panel is preferably shrink-wrapped in a gas- and moisture-tight film. Leakage inside the vacuum insulating panel causes a reduction of the thermal insulation.

The seal preferably includes polymers or silane-modified polymers, particularly preferably organic polysulfides, silicones, RTV (room temperature vulcanizing) silicone rubber, HTV (high temperature vulcanizing) silicone rubber, peroxide vulcanizing silicone rubber, and/or addition vulcanizing silicone rubber, polyurethanes, butyl rubber, polyacrylates, and/or mixtures or copolymers thereof.

The seal preferably has a thickness of 1 mm to 5 mm and/or a height of 15 mm to 30 mm. The dimensions of the seal are preferably determined based on the dimensioning of the spacer.

The spacer preferably contains a desiccant, particularly preferably silica gel, $CaCl_2$, $Na_2SO_4$, activated carbon, silicates, bentonites, zeolites, and/or mixtures thereof. The desiccant can bind moisture penetrating over time into the insulating glazing and prevent fogging of the internal pane surfaces.

The invention further comprises a method for producing a sound-damped insulating glazing. In a first step, a spacer is arranged peripherally on the edge of a first pane. Then, an acoustic insulating plate is arranged inside the spacer on the first pane. The acoustic insulating plate preferably includes, as explained above, a polymer foam plate, particularly preferably polymer foam plates that have, with a thickness of at least 50 mm, a sound absorption coefficient of at least 0.5 (in accordance with ISO-10534-2, measured in the range from 600 Hz to 4000 Hz). In a next step, a vacuum insulating panel is arranged on the acoustic insulating plate. Finally, a second pane is arranged on the spacer and bonded together with a seal in an internal interspace, gap, or joint between the first pane, the spacer, and the second pane to form an insulating glazing. The final production of the insulating glass pane preferably takes place in the manner familiar to the person skilled in the art.

The invention further comprises the use of the insulating glazing according to the invention in buildings, particularly preferably in interior and exterior façades. The insulating glazing according to the invention is preferably used in nontransparent exterior façades or in mixed façades made of transparent and nontransparent elements.

The invention is explained in detail in the following with reference to drawings. The drawings are a purely schematic representation and are not true to scale. They in no way restrict the invention.

Figure 2:
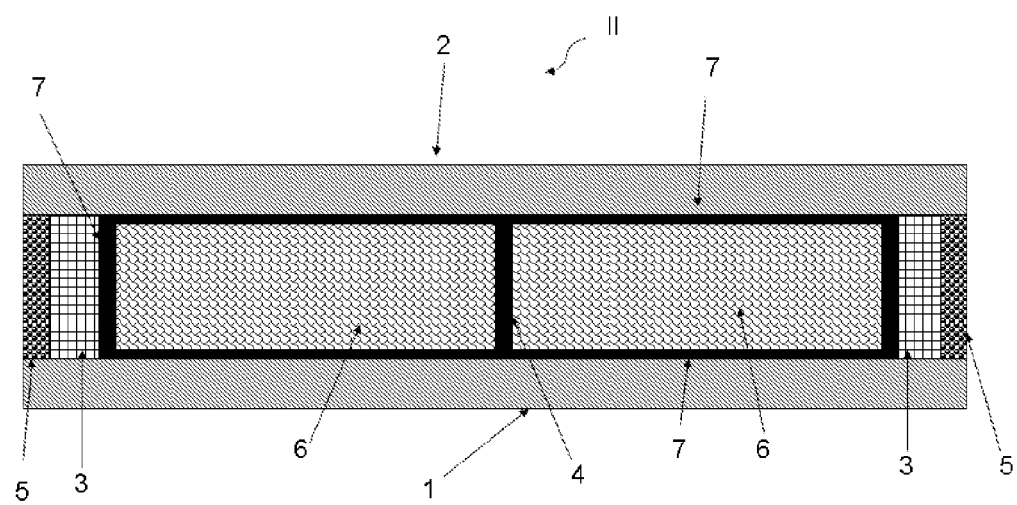
Figure 3:
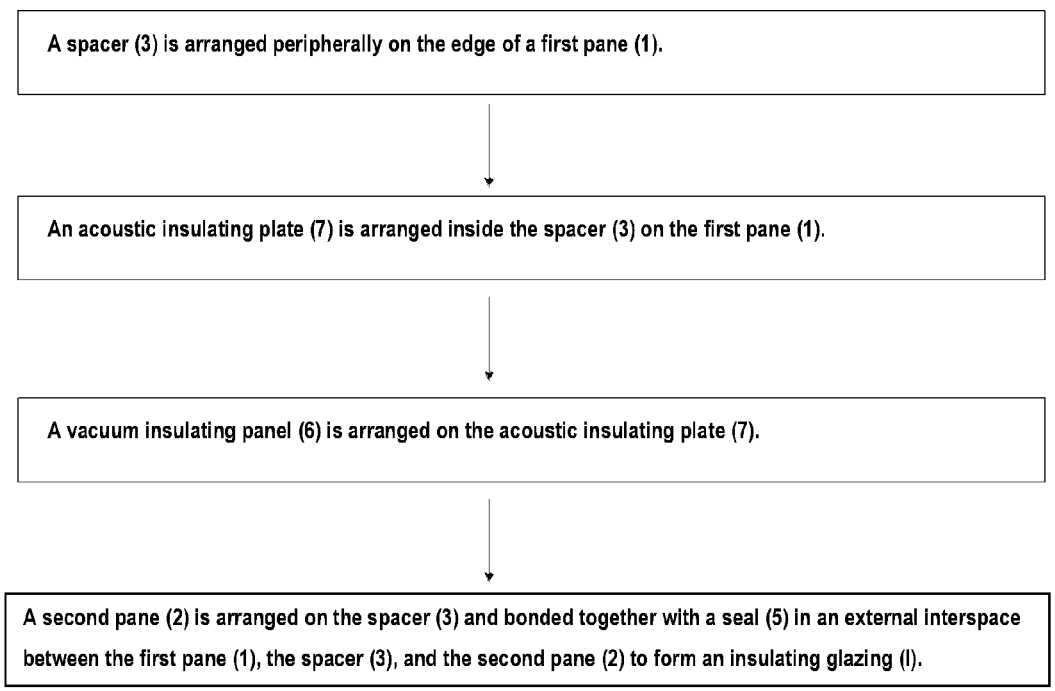

They depict:

FIG. 1 a cross-section of an insulating glazing according to the invention,

FIG. 2 a cross-section of a preferred embodiment of the insulating glazing according to the invention, and FIG. 3 a flowchart of the method for producing the insulating glazing according to the invention.

FIG. 1 depicts a cross-section of an insulating glazing (I) according to the invention. A peripheral spacer (3) is arranged between a first pane (1) and a second pane (2). The outer edge between the first pane (1), second pane (2), and the spacer is closed and sealed by a seal (5). The seal (5) is situated in a gap (5') between the first pane (1), the spacer (3), and the second pane (2). Two vacuum insulating panels (6) are arranged inside the spacer (3). The vacuum insulating panels (6) are sealed by a gas- and moisture-tight film (9). The insulation effect of the vacuum insulating panels (6) is substantially dependent on the vacuum and, thus, on the leakproofness of the gas- and moisture-tight film (9). An acoustic insulating plate (7) clearly reduces the sound permeability of the insulating glazing (I) according to the invention relative to an insulating glazing according to the prior art.

FIG. 2 depicts a cross-section of a preferred embodiment of the insulating glazing (II) according to the invention. The basic structure of the insulating glazing (II) corresponds to that depicted in FIG. 1. All interspaces between the vacuum panels (6) and the first pane (1), the second pane (2) and the spacer (3) are filled with acoustic insulating plates (7) and acoustic dividing plates (4). In this depicted preferred embodiment of the insulating glazing (II), the acoustic and also the thermal insulation are also clearly increased relative to embodiment of the insulating glazing (I) depicted in FIG. 1.

FIG. 3 depicts a flowchart of the method for producing the insulating glazing (II) according to the invention. In a first step, a spacer (3) is arranged peripherally on the edge of a first pane (1). Then, an acoustic insulating plate (7) is arranged inside the spacer (3) on the first pane (1). In a next step, a vacuum insulating panel (6) is arranged on the acoustic insulating plate (7). Finally, a second pane (2) is arranged on the spacer (3) and bonded together with a seal (5) in an external interspace between the first pane (1), the spacer (3), and the second pane (2) to form an insulating glazing (II).

LIST OF REFERENCE CHARACTERS (1) first pane
(2) second pane (3) spacer
(4) acoustic dividing plate
(5) seal
(5') gap, joint, or interspace between the first pane (1), the spacer (3), and the second pane (2)
(6) vacuum insulating panel
(7) acoustic insulating plate
(I, II) insulating glazings according to the invention

The invention claimed is:

1. A sound-damped insulating glazing comprising at least:
   a first pane and a second pane;
   a peripheral spacer between the first pane and the second pane;
   an externally encircling seal in a gap between the first pane, the peripheral spacer and the second pane;
   two or more vacuum insulating panels between the first pane, the second pane and the peripheral spacer;
   at least one acoustic insulating plate arranged on at least one surface of the at least one vacuum insulating panel, and
   an acoustic dividing plate arranged between adjacent vacuum insulating panels of the two or more vacuum insulating panels.

2. The insulating glazing according to claim 1, wherein the externally encircling seal includes preferably polymers or silane-modified polymers.

3. The insulating glazing according to claim 1, wherein the at least one acoustic insulating plate is arranged between the second pane and the vacuum insulating panel and/or between the peripheral spacer and the at least one vacuum insulating panel.

4. The insulating glazing according to claim 1, wherein the at least one acoustic insulating plate has a thickness between 0.5 mm to 5 mm.

5. The insulating glazing according to claim 1, wherein the at least one acoustic insulating plate and/or the acoustic dividing plate contain:
   thermoplastic, elastic, or duroplastic polymer foams, or
   i) polyurethanes, ii) polyethylene, iii) polyvinyl chloride, iv) melamine resin, v) soft polyurethane foam (PUR) and/or hard PUR, mixtures of i)-v) or copolymers of i)-v).

6. The insulating glazing according to claim 1, wherein the vacuum insulating panel contains a filler.

7. The insulating glazing according to claim 1, wherein the vacuum insulating panel includes a gas- and moisture-tight film.

8. The insulating glazing according to claim 2, wherein the polymers or silane-modified polymers are organic polysulfides, silicones, RTV (room temperature vulcanizing) silicone rubber, HTV (high temperature vulcanizing) silicone rubber, peroxide vulcanizing silicone rubber, and/or addition vulcanizing silicone rubber, polyurethanes, butyl rubber, and/or polyacrylates.

9. The insulating glazing according to claim 1, wherein the externally encircling seal has a thickness of 1 mm to 5 mm and/or a height of 15 mm to 30 mm.

10. The insulating glazing according to claim 1, wherein the peripheral spacer contains a i) desiccant, preferably silica gel, ii) $CaCl_2$, iii) $Na_2SO_4$, iv) activated carbon, v) silicates, vi) bentonites, vii) zeolites, or mixtures of i)-vii).

11. A method for producing a sound-damped insulating glazing, comprising:
    arranging a spacer peripherally on an edge of a first pane;
    arranging at least one acoustic insulating plate inside the spacer on the first pane;
    arranging two or more vacuum insulating panels on the acoustic insulating plate;
    arranging an acoustic dividing plate between adjacent vacuum insulating panels of the two or more vacuum insulating panels;
    arranging a second pane on the spacer; and
    bonding the second pane together with a seal in a gap between the first pane, the spacer and the second pane to form the insulating glazing.

12. The method according to claim 11, wherein each vacuum insulating panel of the two or more vacuum insulating panels has more than one acoustic insulating plate on surfaces of the vacuum insulating panel before the second pane is arranged on the spacer.

13. A method comprising:
    using the insulating glazing according to claim 1 in buildings, preferably in interior and exterior facades, particularly preferably in nontransparent exterior facades.

14. The insulating glazing according to claim 5, wherein the polymer foam is polystyrene.

15. A sound-damped insulating glazing comprising:
    a first pane and a second pane;
    a peripheral spacer between the first pane and the second pane;
    an externally encircling seal in a gap between the first pane, the peripheral spacer and the second pane;
    at least one vacuum insulating panel between the first pane, the second pane and the peripheral spacer, the at least one vacuum insulating pane containing a filler; and
    at least one acoustic insulating plate arranged on at least one surface of the at least one vacuum insulating panel.

16. The insulating glazing according to claim 15, wherein the filler has a mean diameter of 10 nm to 100 μm.

17. The insulating glazing according to claim 15, wherein the vacuum insulating panel contains, as the filler, powders, granulates, fibers or feathers.

18. The insulating glazing according to claim 15, wherein the filler is $SiO_2$ or aerogel powder.

* * * * *

UNITED STATES PATENT AND TRADEMARK OFFICE
CERTIFICATE OF CORRECTION

Page 1 of 1

PATENT NO.       : 9,169,687 B2
APPLICATION NO.  : 14/131645
DATED            : October 27, 2015
INVENTOR(S)      : Walter Schreiber et al.

It is certified that error appears in the above-identified patent and that said Letters Patent is hereby corrected as shown below:

In The Specification

Column 1, lines 20-21, please delete "hope this one was".

Signed and Sealed this
Twenty-third Day of February, 2016

Michelle K. Lee
*Director of the United States Patent and Trademark Office*